O. ABEREGG.
TACHOMETER.
APPLICATION FILED JUNE 20, 1913.

1,075,998.

Patented Oct. 14, 1913.

Witnesses:

Inventor
Otto Aberegg
by his Attorney

UNITED STATES PATENT OFFICE.

OTTO ABEREGG, OF BERNE, SWITZERLAND, ASSIGNOR TO HASLER A. G. VORMALS TELEGRAPHEN-WERKSTÄTTE VON G. HASLER, OF BERNE, SWITZERLAND, A CORPORATION OF SWITZERLAND.

TACHOMETER.

1,075,998.  Specification of Letters Patent.  Patented Oct. 14, 1913.

Application filed June 20, 1913. Serial No. 774,729.

*To all whom it may concern:*

Be it known that I, OTTO ABEREGG, a citizen of the Swiss Confederation, and residing at Berne, Switzerland, have invented certain new and useful Improvements in Tachometers, of which the following is a specification.

My invention relates to tachometers of the type described in the United States Patent No. 1,057,064, in which a plurality of measuring pieces which advance a pointer at equal intervals of time are arranged around a guide which is intermittently rotated through a predetermined angle during each measuring period, each of these measuring pieces being adjusted during each interval of time by the shaft under test an amount dependent on the speed of the latter, while the measuring piece which was influenced by this shaft during the preceding measuring period is held fast in the position it obtained at the end of this period and the previously held measuring piece is simultaneously released.

A primary object of my invention is to reduce the wear of those parts of the tachometer which are intermittently engaged during its operation. To this end, I make the measuring pieces and the detent in the form of cylindrical tubes, the measuring pieces being rotatable and axially displaceable on guide-rods and the detent being journaled on a rocking arm which is pressed resiliently in the direction of the guide carrying the measuring pieces.

One illustrative embodiment of my invention is represented by way of example in the accompanying drawing, which shows those portions of the mechanism of the improved tachometer which are requisite to explain my invention.

Figure 1:
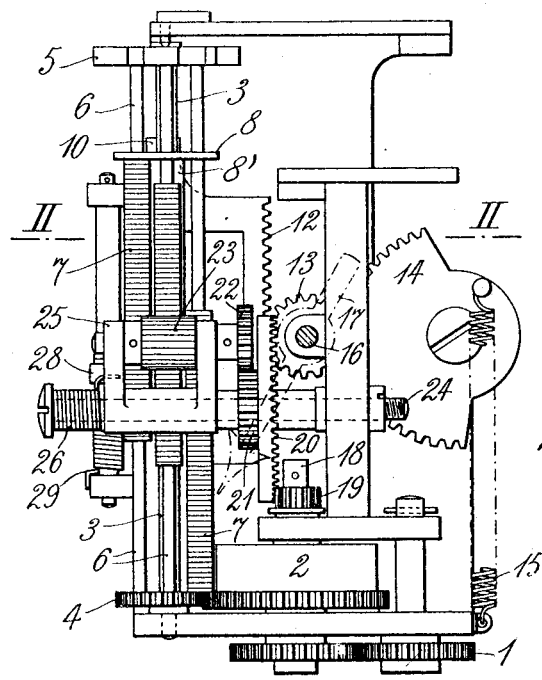
Figure 3:
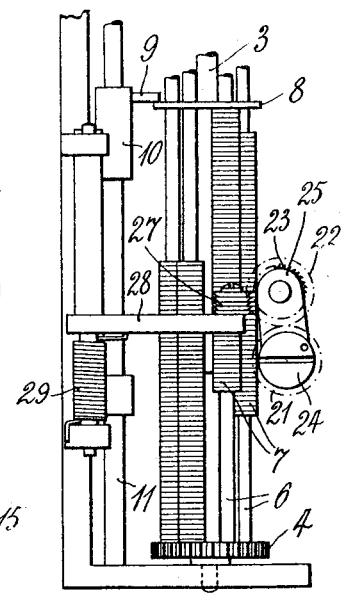
Figure 2:
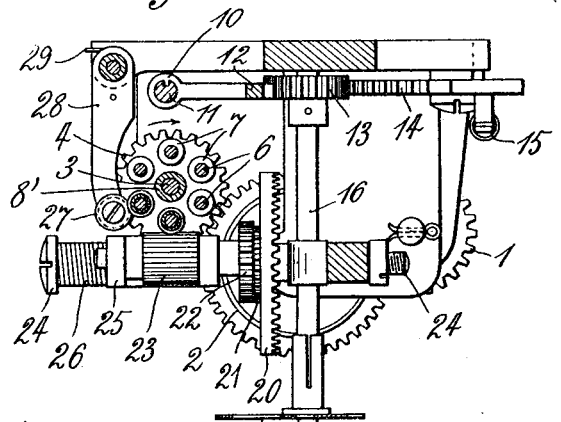
Figure 4:
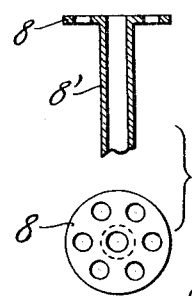

In the drawing:—Figure 1 is a front elevation of the said mechanism as viewed from the right-hand side of Fig. 3, Fig. 2 is a horizontal section taken on the line II—II in Fig. 1, Fig. 3 is a side elevation of the mechanism shown in Fig. 1, and Fig. 4 shows a detail in vertical section and top-plan view.

Referring to the drawing, the gear 1, adapted to be operatively connected by suitable means, not shown, with the shaft under test, is positively connected with a driving barrel 2. The toothing on this barrel meshes with a gear 4 fast on the lower end of a vertical axle 3 and intermittently rotates this gear and its axle; the latter carries at its upper end an escapement wheel 5 which is regulated by means well known and therefore not shown, e. g. by means of an anchor and balance. Around the axle 3 are arranged six vertical rods 6, the lower ends of which are fast in the gear 4 and the upper ends fast in the escapement wheel 5. The measuring pieces 7 having the form of tubes having toothed peripheries are mounted rotatably and axially displaceably on these rods 6, and are normally held by gravity in their lowest position, where they rest on the gear 4. Above the measuring pieces is located a vertically displaceable plate 8 having at its center a guide-hub 8' extending downwardly and surrounding the axle 3. On the plate 8 bears a lug 9 of a sleeve 10 which is slidable on a vertical rod 11 and carries at the end of a laterally extending arm 12' a downwardly extending rack 12. The latter meshes with a pinion 13, which on its opposite side meshes with a toothed segment 14. This segment is influenced by a draw-spring 15, which, owing to this segment being positively connected with the rack and the lug 9, causes the latter to be pressed firmly onto the plate 8 and prevents it from rising from the same even when there is considerable vibration. The pinion 13 is fast on an axle 16, one end of which carries a pointer 17 movable over a scale, not shown.

On the axle 18 of the barrel 2 is mounted a pinion 19 which meshes with a crown-wheel 20. The latter is positively connected with a pinion 23 by means of the intermediate gears 21 and 22. This pinion 23 is journaled in a carrier 25 which is able to rock about the stationary axle 24 carrying the crown-wheel 20 and the gear 21 and, owing to this carrier being acted on by a helical spring 26, is pressed against that measuring piece 7 which is located opposite to it, so that the said pinion meshes with the latter and when suitably rotated raises it. To keep the measuring piece in its raised position when the gear 4 next rotates, a detent 27 is provided. The latter is analogous in form to the measuring pieces, i. e. consists of a tube, toothed on its periphery, rotatably mounted on a vertical pin rising from the free end of an arm 28 mounted to rock horizontally. This arm 28 is pressed toward the axle 3 by means of a coil spring 29, whereby the detent 27 meshes with that measuring piece which meshed with the pinion 23 during the previous measuring period and comes into gear with the next measuring piece the moment the latter is disengaged from the pinion 23.

The above-described tachometer operates as follows:—Owing to the gear 1 being rotated, the spring in the barrel 2 is wound up and intermittently drives the axle 3 carrying the measuring pieces 7, the pinion 23 being driven by the axle 18 at a speed corresponding to that of the shaft under test. Each measuring piece remains in engagement with the pinion 23 for a predetermined period, i. e. the measuring period, e. g. one second, and during this period is raised a distance corresponding to the speed of the shaft under test. That measuring piece which is raised correspondingly raises the plate 8, and the latter raises the lug 9 and the rack 12 which rotates the pointer 17. When the axle 3 is next rotated the measuring piece now meshing with the pinion 23 becomes disengaged therefrom, but before such disengagement occurs, this measuring piece comes into engagement with the detent 27. This measuring piece is held at the same elevation by the latter during the next measuring period and the pointer 17 therefore remains in the same position. In the meantime the next measuring piece has been engaged by the pinion 23 and is likewise raised. If the speed of the shaft under test is higher than during the previous second, this measuring piece is raised to a greater height depending on the difference in the speed, and the pointer 17 is correspondingly advanced. If, however, the speed is lower, the measuring piece is not raised so high, and does not reach the plate 8 (Figs. 1 and 2). When the axle 3 is next rotated, the measuring piece then engaged by the detent 27 is released from the latter and therefore falls to its lowest position. The plate 8 simultaneously falls onto the measuring piece immediately following, and the rack 12 therefore falls an amount corresponding to the difference in the speeds, the pointer being of course brought back. The above series of operations is continually repeated while the tachometer is in operation. As compared with the tachometer described in the above-mentioned patent my improved tachometer has the advantage that, since both the measuring pieces and the detent are rotatable about their own axes, they wear more uniformly, because the measuring pieces 7 constantly engage at different places with the pinion 23 and with the detent 27.

I claim:—

1. In a tachometer of the character described, the combination of a plurality of guide rods conjointly rotatable about a common axis, a cylindrical, toothed measuring piece slidable along and rotatable on each of said rods, a spring-influenced detent adapted to arrest the measuring pieces in turn, and means for intermittently rotating said guide rods about said axis.

2. In a tachometer of the character described, the combination of a plurality of guide rods conjointly rotatable about a common axis, a cylindrical, toothed measuring piece slidable along and rotatable on each of said rods, a spring-influenced arm, a cylindrical, toothed detent rotatably mounted on said arm and adapted to arrest the measuring pieces in turn, and means for intermittently rotating said guide rods about said axis.

In testimony whereof, I affix my signature in the presence of two witnesses.

OTTO ABEREGG.

Witnesses:
 FRIEDRICH NAEGELI,
 NATHANAËL LEUBA.